United States Patent [19]

Grob et al.

[11] 4,262,557
[45] Apr. 21, 1981

[54] METHOD AND SYSTEM FOR LIMITING THE JOLT DURING GEAR SHIFTS IN A MOTOR VEHICLE

[75] Inventors: Ferdinand Grob, Besigheim; Friedrich Rabus, Schwieberdingen, both of Fed. Rep. of Germany

[73] Assignee: Robert Bosch GmbH, Stuttgart, Fed. Rep. of Germany

[21] Appl. No.: 965,742

[22] Filed: Dec. 4, 1978

[30] Foreign Application Priority Data

Dec. 10, 1977 [DE] Fed. Rep. of Germany ....... 2755202

[51] Int. Cl.³ .............................................. B60K 41/04
[52] U.S. Cl. .................................. 74/861; 180/70 R; 192/103 C
[58] Field of Search ................... 180/290, 282, 70 R, 180/77 R; 74/866, 856, 861, 862; 192/103 C, 52, 84 R, 0.076

[56] References Cited

U.S. PATENT DOCUMENTS

| | | | |
|---|---|---|---|
| 3,710,647 | 1/1973 | Dach et al. | 74/866 X |
| 3,752,284 | 8/1973 | Brittain et al. | 192/103 C X |
| 3,759,344 | 9/1973 | Blee et al. | 74/866 X |
| 3,942,393 | 3/1976 | Forster et al. | 192/103 C X |

*Primary Examiner*—John J. Love
*Assistant Examiner*—D. W. Underwood
*Attorney, Agent, or Firm*—Frishauf, Holtz, Goodman & Woodward

[57] ABSTRACT

Since the maximum jolt amplitude during gear shifts in an automatic transmission occurs when a frictional clutch band is first holding fully and since a mathematical relationship can be established between this maximum amplitude and the amplitude of the jolt while the band is slipping, the maximum permissible jolt amplitude during slippage ($R_O$) is calculated as a function of the input and output speed of the transmission at the start of the gear shift and the predetermined maximum permissible over-all jolt amplitude ($R_{max}$). The actual jolt amplitude is determined continuously, compared to $R_O$, and the friction band is activated to maintain the actual jolt equal to $R_O$, while the band is slipping.

5 Claims, 3 Drawing Figures

METHOD AND SYSTEM FOR LIMITING THE JOLT DURING GEAR SHIFTS IN A MOTOR VEHICLE

The present invention relates to methods and systems for limiting the jolts in a motor vehicle during gear shift operations.

BACKGROUND AND PRIOR ART

Various jolt limiting methods and systems are disclosed in the cross referenced applications and patents. German disclosure document DT-OS No. 21 24.204 (corresponding to U.S. Application Ser. No. 252,559 filed May 12, 1972; now U.S. Pat. No. 3,942,393) discloses apparatus in which the friction elements which control the transmission of torque between the engine and the transmission output are regulated to a prescribed rate of change of engine speed with respect to time. This prescribed rate of change of engine speed is computed as a function of engine speed, engine torque, the direction of the gear shift, the selected gear ratio, the temperature of the oil in the transmission and the load of the motor vehicle. The so computed desired jolt value and the actual jolt as computed by the rate of change of engine speed with respect to time are applied to a regulator which in turn, through an amplifier and an output control, controls the pressure regulator for the friction elements of the transmission. The peaks which appear in the variation with respect to time of the torque and of the oil pressure in the pressure regulator during the gear shift are decreased by means of a delay element, for example an RC circuit, or by oil nozzles in the pressure system.

It is a disadvantage of these known systems that the actual jolt is only partially represented, while the jolt which exists after the friction elements have become completely engaged, that is the jolt resulting from the rigidity of the transmission output, is not taken into consideration at all.

A system has further been disclosed (U.S. Pat. No. 4,172,505) in which the then-present value of the jolt is determined, the maximum value of the jolt if complete engagement of the friction elements were to take place at the particular time is computed, the higher of the two values is compared to the maximum permissible value of jolt, and the difference between these two signals is applied to a regulator for activating the friction elements.

THE INVENTION

It is an object of the present invention to furnish a method and system in which the jolt which occurs while the friction elements are slipping relative to one another is limited to such a value that the jolt peak which occurs after the friction elements are fully engaged does not exceed a predetermined maximum value.

More specifically, in accordance with the present invention, the maximum permissible jolt while the friction elements are slipping relative to one another is computed in dependence on the transmission input and output speeds existing at the time of the initiation of the gear shift and on the maximum permissible jolt value. Since the maximum jolt amplitude occurs right after the friction elements have become completely engaged, the maximum permissible jolt value during the time that the friction elements are slipping relative to each other is less than the maximum permissible jolt. The computation involves only the implementation of a very simple mathematical expression. A very simple computer stage can thus be used while still providing a very close approximation of the actual physical relationships in the vehicle.

In a preferred embodiment of the present invention the computer stage is a microprocessor. The first and second speed signals, respectively corresponding to the transmission input and output speeds, are applied to the microprocessor. The microprocessor is connected with the conventional electronic gear control systems so that it cooperates in general with the conventional electronic units which are present in the vehicle in any case. This also results in a particularly simple and economical device.

DRAWINGS ILLUSTRATING A PREFERRED EMBODIMENT

Figure 1:
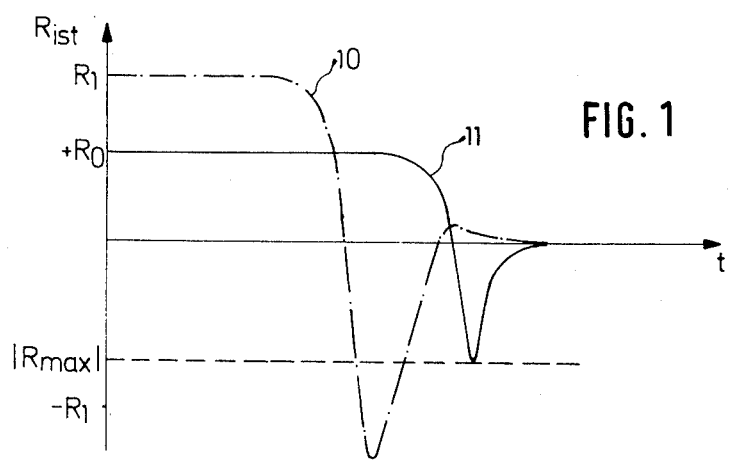
FIG. 1 shows the variation of jolt with respect to time for a prior art system and for the system according to the present invention.

As mentioned above, in vehicles equipped with prior art jolt regulators in which the difference between the actual jolt experienced by the motor vehicle and a predetermined maximum allowable constant jolt is determined and used to regulate the pressure applied to the friction elements, a negative jolt of uncontrollable amplitude occurs after the friction elements have become completely engaged due to the unloading of the elements which then occurs. The variation with respect to time of the jolt for the prior art systems is shown in curve 10 of FIG. 1. It will be noted that, during slippage of the friction elements, the jolt is regulated to a constant value $R_1$. After the elements have become engaged, a negative jolt peak occurs whose amplitude exceeds $R_1$. However, this negative jolt peak can be calculated. The negative jolt peak varies as a function of the input and output speed of the transmission ($n_1$, $n_2$) and may be computed as a function of these two speeds as well as the jolt amplitude ($R_1$) existing while the friction elements are slipping relative to each other. However, this also means that the maximum permissible jolt during slippage can be calculated if the amplitude of the jolt peak after the friction elements have become completely engaged is to be equal to the maximum allowable jolt. Specifically, the maximum permissible jolt during the time that the friction elements are slipping relative to each other may be computed from the above-mentioned values by the following equation:

$$R_o = K \frac{R_{max}2}{n_{1(o)} - n_{2(o)}}$$

where $R_O$ is the maximum permissible jolt during the time that the friction elements are slipping relative to each other, K is a constant associated with the vehicle, $R_{max}$ the maximum allowable jolt amplitude, $n_{1(o)}$ the input speed of the transmission, and $n_{2(o)}$ the transmission output speed at the time that the gear shift is being initiated. If now the maximum allowable jolt amplitude $R_{max}$ has been determined and if the transmission input and output speeds at the time the gear shift is initiated are $n_{1(o)}$ and $n_{2(o)}$ respectively, and if the maximum jolt during the slippage time is regulated to be $R_O$, then the maximum negative peak jolt which will occur after the friction elements have become fully engaged will be just equal to the maximum allowable jolt $R_{max}$. The curve of the jolt variation with respect to time for a system using such a computation, that is a system in accordance with the present invention, is shown in curve 11 of FIG. 1.

Figure 2:
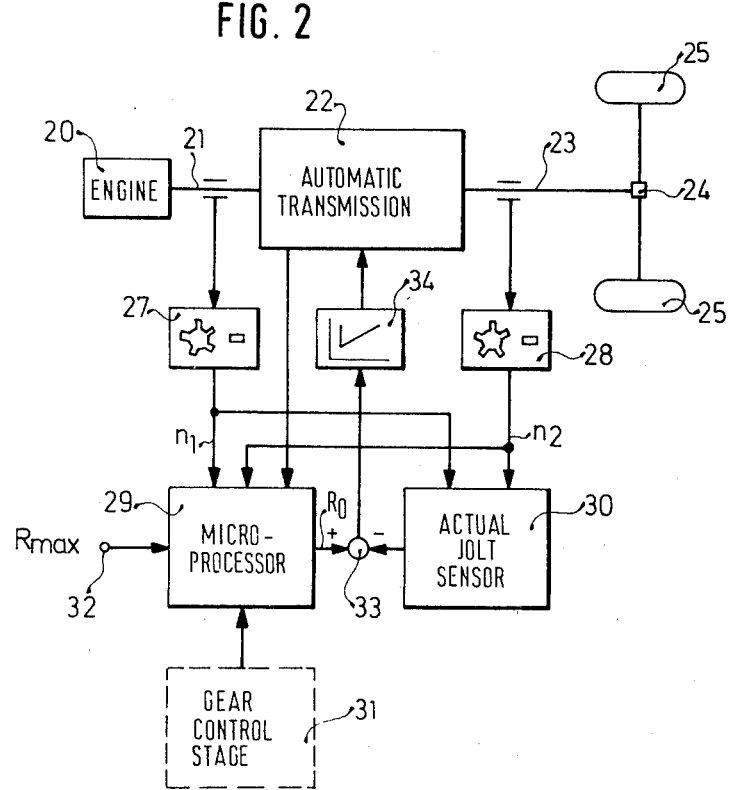
FIG. 2 is a block diagram of a jolt regulator system according to the present invention.

FIG. 2 is a block diagram of a jolt limiting system in accordance with the present invention. An engine 20 is connected through an input shaft 21 to an automatic transmission 22 which is operable in a plurality of selectable gear ratios. The output of automatic transmission 22 is connected to a shaft 23 which forms the connection to the transmission load, namely a differential 24 and wheels 25. The transmission speed is sensed by a speed sensor 27, while the transmission output speed is sensed by a speed sensor 28. Speed sensors 27 and 28 are both connected to the inputs of a computer stage 29 and an actual jolt calculating stage 30. A gear control stage 31 applies a shift start signal at the start of each gear shift operation to computer stage 29. Further, a signal signifying the maximum permissible jolt is applied to computer stage 29 at a terminal 32. The outputs of stages 29 and 30 are applied to respective inputs of a comparator 33 whose output is connected to the input of a regulator 34. Regulator 34 furnishes regulator output signals which control the activation of the friction elements of the automatic transmission 22.

OPERATION

The shift start signal applied to computer stage 29 by stage 31 initiates the computation process. The then-present transmission input speeds $n_{1(o)}$ and transmission output speeds $n_{2(o)}$ as well as the maximum permissible jolt value $R_{max}$ and the constant K are used to compute the maximum permissible slippage jolt $R_O$. The so-computed value of $R_O$ is applied to one input of a comparator to whose other input the actual jolt value is being applied. Stage 30, which computes the actual jolt value as a function of the input and output speeds is known and may, for example, be a stage disclosed in U.S. Pat. No. 4,172,505. The difference between the reference and actual values of jolt, that is the output of a comparator 33 constitutes a regulator input signal which determines the activation and control of the friction elements in the automatic transmission.

The following values apply to a preferred embodiment:

| K + | 21,5 1/g | g + acceleration |
|---|---|---|
| $R_{Max}$ = | 1 g/s | due to gravity |
| $R_o$ + | 1 g/s | |

Figure 3:
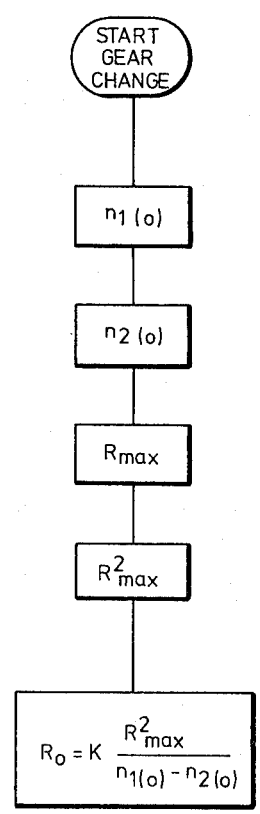
FIG. 3 is a flow chart for the microprocessor of FIG. 2.

In a preferred embodiment computer stage 29 is a microprocessor. The microprocessor preferably has a central processing unit, a random access memory, and a read-only memory. A flow chart for the microprocessor is shown in FIG. 3.

Various changes and modifications may be made within the scope of the inventive concepts.

We claim:

1. In a motor vehicle having an engine (20), wheels (25), regulator means (34) for furnishing regulator output signals, transmission means (22) operative in a plurality of gear ratios for transmitting torque from said engine to said wheels, said transmission means having a plurality of friction elements operative under control of said regulator output signals in a slippage phase and a fully engaged phase, shift start signal furnishing means for furnishing a shift start signal at the start of each gear shift operation, first and second speed sensor means (27, 28) for furnishing a first and second speed signal respectively signifying the then-present input speed and then-present output speed of said transmission means, actual jolt signal furnishing means (30) for furnishing an actual jolt signal corresponding to the actual jolt of said vehicle, and maximum jolt signal furnishing means for furnishing a maximum permissible jolt signal indicative of the maximum permissible jolt of said vehicle:

a method for regulating the jolt of said vehicle to less than said maximum permissible jolt both during said slippage phase and said fully engaged phase, comprising the steps of creating a first and second initial speed signal corresponding, respectively, to said input speed of said transmission and said output speed of said transmission at the start of said gear shift operation; computing a maximum permissible slippage jolt from said first and said second initial speed signal and said maximum permissible jolt signal and furnishing a maximum permissible slippage jolt signal corresponding thereto; creating regulator input signals corresponding to the difference between said maximum permissible slippage jolt signal and said actual jolt signal; and applying said regulator input signals to said regulator means for controlling the operation thereof.

2. A method as set forth in claim 1, wherein said step of computing said maximum permissible slippage jolt from said first and second initial speed signal and said maximum permissible jolt signal comprises computing said maximum permissible slippage jolt according to the equation:

$$R_o = K \frac{R_{max}2}{n_{1(o)} - n_{2(o)}}$$

where $R_O$ is the maximum permissible jolt during the time that the friction elements are slipping relative to each other, K is a constant associated with the vehicle, $R_{max}$ the maximum allowable jolt amplitude, $n_{1(o)}$ the input speed of the transmission, and $n_{2(o)}$ the transmission output speed at the time that the gear shift is being initiated.

3. In a motor vehicle having an engine (20), wheels (25), regulator means (34) for furnishing regulator output signals, transmission means (22) operative in a plurality of gear ratios for transmitting torque from said engine to said wheels, said transmission means having a plurality of friction elements operative under control of said regulator output signals in a slippage phase and a fully engaged phase, shift start signal furnishing means for furnishing a shift start signal at the start of each gear shift operation, first and second speed sensor means (27, 28) for furnishing a first and second speed signal respectively signifying the then-present input speed and then-present output speed of said transmission means, actual jolt signal furnishing means (30) for furnishing an actual jolt signal corresponding to the actual jolt of said vehicle, and maximum jolt signal furnishing means for furnishing a maximum permissible jolt signal indicative of the maximum permissible jolt of said vehicle:

apparatus for regulating the jolt of said vehicle to less than said maximum permissible jolt both during said slippage phase and said fully engaged phase, comprising computer means (29) connected to said first and second speed sensor means, said shift start signal furnishing means, and said maximum permissible jolt signal furnishing means, for furnishing a first and second initial speed signal corresponding, respectively, to said first and second speed signal upon receipt of said shift start signal, computing a maximum permissible slippage jolt as a function of said first and second initial speed signal and said maximum permissible jolt signal, and furnishing a maximum permissible slippage jolt signal corresponding to the so computed maximum permissible slippage jolt; and comparator means (33) connected to said computer means, said actual jolt signal furnishing means and said regulator means for furnishing regulator input signals controlling the operation of said regulator means in response to said maximum permissible slippage jolt signal and said actual jolt signal.

4. A system as set forth in claim 3, wherein said comparator means comprises means for furnishing said regulator input signals as a function of the difference between said actual jolt signal and said maximum permissible slippage jolt signal.

5. A system as set forth in claim 3, wherein said computer means comprises means for computing said maximum permissible slippage jolt from said first and second initial speed signal and said maximum permissible jolt signal in accordance with the equation:

$$R_o = K \frac{R_{max2}}{n_{1(o)} - n_{2(o)}}$$

where $R_O$ is the maximum permissible jolt during the time that the friction elements are slipping relative to each other, K is a constant associated with the vehicle, $R_{max}$ the maximum allowable jolt amplitude, $n_{1(o)}$ the input speed of the transmission, and $n_{2(o)}$ the transmission output speed at the time that the gear shift is being initiated.

* * * * *